(No Model.)
H. G. BUCH.
NUT LOCK.
No. 328,456. Patented Oct. 20, 1885.
Fig. I.
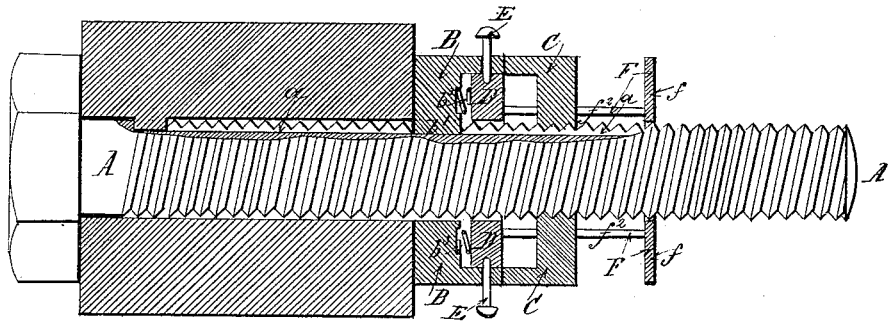
Fig. II.  Fig. III.
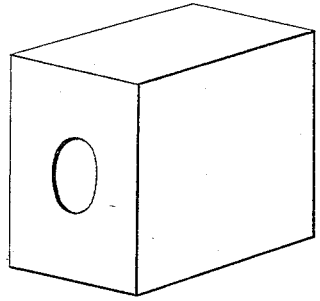 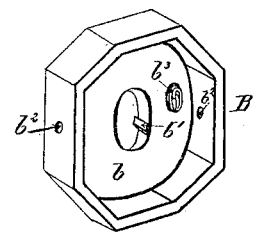
Fig. IV.  Fig. V.
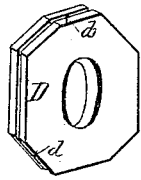 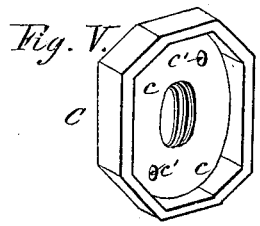
Fig. VI
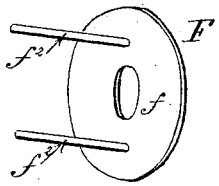
WITNESSES:
Geo. W. Lane
Alexander Harris
INVENTOR.
Henry G. Buch
BY
Wm. R. Gerhart
ATTORNEY

UNITED STATES PATENT OFFICE.

HENRY G. BUCH, OF OREGON, PENNSYLVANIA.

NUT-LOCK.

SPECIFICATION forming part of Letters Patent No. 328,456, dated October 20, 1885.

Application filed May 16, 1885. Serial No. 165,715. (No model.)

*To all whom it may concern:*

Be it known that I, HENRY G. BUCH, a citizen of the United States, residing at Oregon, in the county of Lancaster and State of Pennsylvania, have invented certain Improvements in Locking-Nuts, of which the following is a specification.

My invention relates to improvements in nut-locks, in which a grooved bolt, a recessed washer and nut, with a locking-block which operates in the recesses are used; and the objects of my improvements are, first, to prevent the bolt from turning in the washer, and, second, to keep the nut from unscrewing. I attain these objects by the mechanism illustrated in the accompanying drawings, in which—

Figure I is a longitudinal section of my device as in position just when the nut is screwed home, with part of the screw cut away in order to show the groove. Fig. II is any body through which the bolt may pass, and in which it may be secured. Fig. III is a perspective view of the washer from the recessed side. Fig. IV is a perspective view of the locking-block. Fig. V is a perspective view of the nut from the recessed side, and Fig. VI is a view of the key.

Similar letters refer to similar parts throughout the several views.

The bolt A has a longitudinal groove, $a$, cut in it for so much of its length as might possibly be engaged with the washer. The washer B has an octagonal recess, $b$, sunk in its outer face, a lip, $b'$, projecting from the side of the bolt-hole in the bottom of the recess which corresponds with and engages the groove $a$ of the bolt A, openings $b^2$ through its sides near the bottom of the recess to allow of the passage of the fastening-pins, and a spring or springs, $b^3$, in the bottom of the recess, which act to force the locking-block outward. The recess $c$ in the inner face of the nut C corresponds in shape with that in the washer, and its sides, when the nut is screwed home, coincide with the sides of that in the washer. These recesses receive a locking-block, D, having a groove, $d$, cut in around its perimeter of similar shape, the thickness of which is equal to or a little less than the depth of the recess in the washer.

In applying my device, the bolt being in place, the washer, its lip $b'$ engaging the groove in the bolt, is pushed into place, the locking-block is forced entirely into the recess of the washer and secured there by fastening-pins E inserted through the openings $b^2$ of the washer, the ends of which engage the groove $d$. The nut is screwed into place against the face of the washer, and the pins are withdrawn, when the springs $b^3$ force the locking-block outward into the recess of the nut, which is of less depth than the thickness of the block.

To open the lock, the locking-block is pressed down into the washer by a key, F, composed of a plate, $f$, with two prongs, $f^2$, projecting from one face, which are pushed through openings $c'$ made through the nut for that purpose, the fastening-pins are inserted, and the nut unscrewed.

What I claim as my invention, and desire to secure by Letters Patent, is—

1. As a nut-lock, the combination of a grooved bolt, a washer having an angular recess in its outer face, springs seated in the bottom of the recess, a projecting lip in the bolt-hole for the purpose of engaging the bolt-groove, and openings in the sides for receiving fastening-pins, and a locking-block having a groove cut in its perimeter, of such size and shape as to fit the recess in the washer, with fastening-pins for holding the locking-block down in said recess, and a nut having a recess in its inner face adapted to receive the locking-block, substantially as and for the purpose specified.

2. In a nut-lock, the combination of a grooved bolt, a washer having an angular recess in its outer face, springs seated in the bottom of the recess, a projecting lip in the bolt-hole for the purpose of engaging the bolt-groove, and a locking-block of such size and shape as to fit the recess in the washer, with a nut having a recess in its inner face adapted to engage the locking-block, and openings through the head to permit the passage of the prongs of an opening-key, and the said opening-key, substantially as and for the purpose specified.

HENRY G. BUCH.

Witnesses:
WM. R. GERHART,
W. J. FORDNEY.